Nov. 25, 1924.
J. GEIER
1,516,527
CONVERTIBLE LEVEL
Filed April 18, 1922  2 Sheets-Sheet 1
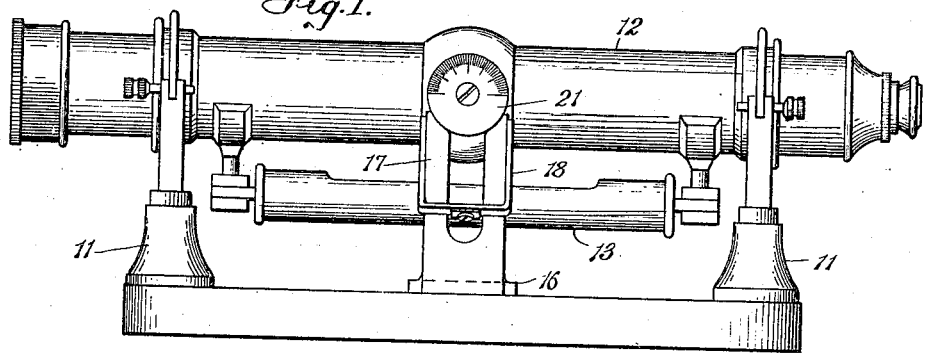
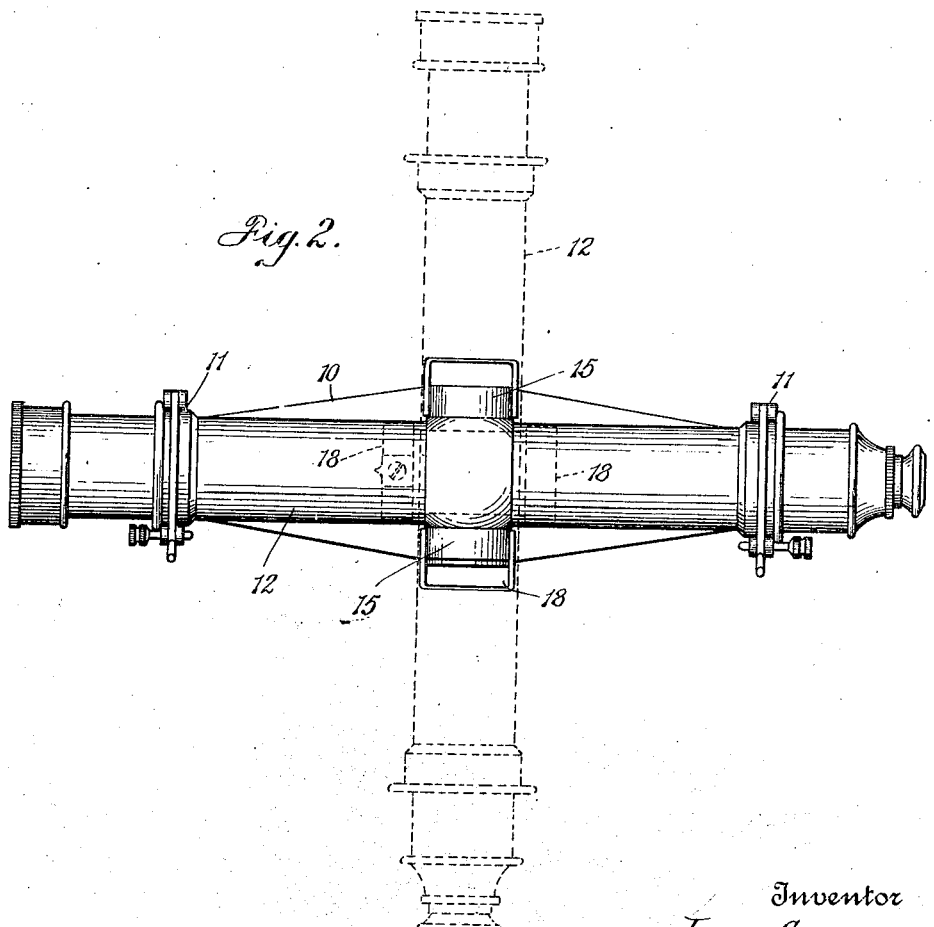
Inventor
James Geier
By his Attorney Nov. 25, 1924.
J. GEIER
1,516,527
CONVERTIBLE LEVEL
Filed April 18, 1922      2 Sheets-Sheet 2
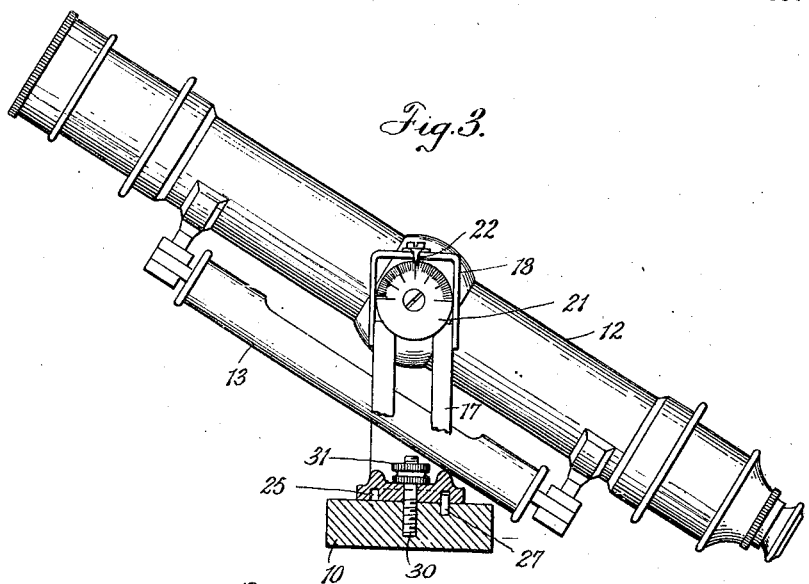
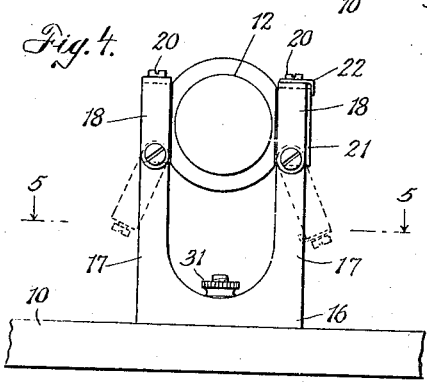
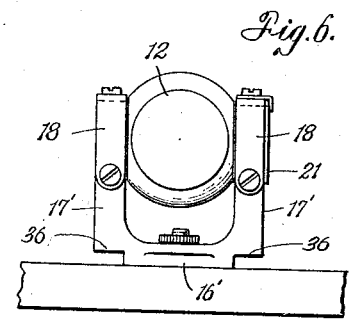
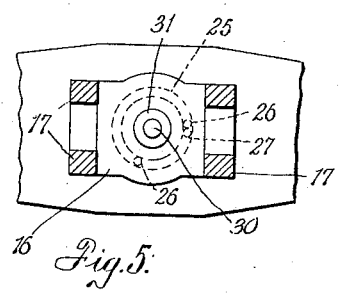
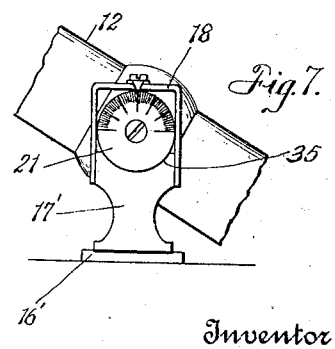
Inventor
James Geier
By his Attorney Patented Nov. 25, 1924.

1,516,527

UNITED STATES PATENT OFFICE.

JAMES GEIER, OF TROY, NEW YORK.

CONVERTIBLE LEVEL.

Application filed April 18, 1922. Serial No. 555,146.

*To all whom it may concern:*

Be it known that I, JAMES GEIER, a citizen of the United States, and a resident of Troy, in the county of Rensselaer and State of New York, have invented certain new and useful Improvements in Convertible Levels, of which the following is a specification.

This invention relates generally to surveying instruments adapted for use by engineers, architects, or the like, having more particular reference to an instrument adapted for interchangeable use as a level or transit, the present invention being an improvement on that shown in a previous patent issued to me on March 23, 1915, under No. 1,133,132.

The present invention has for a general object to facilitate the adjustment of the telescope which is used both as level and transit, from one position to the other.

More specifically speaking, the invention has for an object to provide an adjustable central support for the telescope when in use as a transit, which may be swung to a different position to permit of the telescope being mounted on the usual end supports when in use as a level.

The invention has for a further object to provide a simple and novel means for determining or reading the transit.

Another object is to so construct the instrument that the transit indicating means will comprise a part of the means for mounting the telescope upon the central support, thereby obviating the use of the separate indicating scales which as usually provided project above the telescope consequently making the instrument bulky and rendering the scales more liable to be marred or damaged.

For further comprehension of the invention, and of the objects and advantages thereof, reference will be had to the following description and accompanying drawings, and to the appended claims in which the various novel features of the invention are more particularly set forth.

Fig. 1 of the drawings is a side elevation of a combination instrument embodying the invention, with the various parts thereof adjusted to the position in which the instrument operates as a level.

Figure 2 is a plan view thereof, indicating also in broken lines the parts as adjusted for use as a transit.

Figure 3 is a side elevation of the instrument with the parts adjusted for use as a transit.

Figure 4 is a fragmentary face view thereof.

Figure 5 is a horizontal section on the line 5—5 of Figure 4.

Figure 6 is a similar view to Figure 4 but showing a modification.

Figure 7 is a vertical elevation of the modified form shown in Figure 6 but taken at right angles to the latter figure.

Referring now to the drawings the reference numeral 10 indicates the usual beam or cross bar which may be mounted on a structure similar to that disclosed in my previous patent above referred to for purposes of adjustment and which will hereinafter be referred to as the base. Mounted on the ends of this base are the usual supports 11 upon which the telescope rests when in use as a level.

The telescope is indicated at 12 and is of the type ordinarily used in these instruments, the telescope being shown as equipped with a spirit level 13.

For supporting the telescope when in use as a transit it is provided midway between its ends with a pair of trunnions 15 which rest on an adjustable centre support. This centre support comprises a plate 16 which is formed with a flat undersurface which rests on the base 10, this plate having pairs of legs 17 at opposite ends thereof which present curved upper ends jointly forming seats for the trunnions 15. To hold the trunnions against displacement from the support a pair of bail-like keepers 18 are hinged to the respective pairs of legs as at 19 and are adapted to be swung over the tops of the trunnions, these keepers having screws 20 threaded therethrough which may be adjusted to a bearing relation with the trunnions.

For determining the transit angles I may either fix on one of the trunnions 15 a disk 21 suitably marked off as indicated, or the graduations may be marked off directly upon the side face of the trunnion. A pointer 22 is fixed on the adjacent keeper 18 and projects over the face of the trunnion or disk.

The support 16, 17 is adapted to be adjusted either to a position extending transversely to the base 10, as when the instrument is in use as a level, or to a position extending longitudinally of the base, as when the instrument is in use as a transit.

For convenience in adjustment the plate 16 has a circular groove 25 formed in its underside, a pair of pins 26 being fixed in this groove at the proper angular spacing. Fixed to the base 10 is a third pin 27 which projects into the groove 25 between the pins 26. For holding the support 16, 17 in adjusted positions, and providing a pivot on which it may turn, a screw 30 is fixed in the base 10 concentric to the groove 25 and projects through a central opening in the plate and has a nut 31 threaded on its upper end.

In Figures 6 and 7 I have indicated a slightly modified construction of the central support which is intended more particularly for use when the spirit level is not provided, or is not accommodated under the telescope during use as a transit. In this modification the plate 16' has a single leg on standard 17' at each end thereof which is of only sufficient height to properly mount the telescope alone, and has a concaved upper face 35 forming a seat for the telescope trunnion. The standards 17' have the keepers 18 hinged thereto to take over the trunnions 15, while the plate may have recesses 36 at opposite ends into which the keepers 18 may be swung when not in use. This support is mounted on the beam 10 by the means already described.

It is believed that the manner of operation and use of my improved combination level and transit will be readily understood from the foregoing description, the telescope being readily adjusted from one position to another as may be desired.

Having thus described my invention what I claim as new and desire to protect by Letters Patent of the United States is as follows:—

1. In a surveyor's instrument, a telescope having a pair of trunnions, mounting means for said telescope including a pair of bail-like keepers adapted to be swung over said trunnions, one of said trunnions being provided with an indicating scale and a pointer carried by the adjacent keeper adapted to cooperate with said scale.

2. In a surveyor's instrument, a telescope having a pair of trunnions, a support in which said trunnions engage, and removable keeper devices for said trunnions on said support, one of said trunnions and the adjacent keeper device being provided with means for determining transit angles.

3. In a surveying instrument, a telescope having a pair of trunnions one of said trunnions being provided with an indicating scale, means for mounting said trunnions comprising an adjustable support having arms provided with curved upper ends forming seats for said trunnions, and keepers pivotally mounted upon said arms, said keepers being provided with means and means comprising a part of said mounting means adapted to cooperate with said scale to indicate the angular position of said telescope.

4. In a surveying instrument, a telescope having a pair of enlarged trunnions presenting flat side walls, one of said side walls being provided with an indicating scale and means for mounting said telescope, said mounting means being provided with indicating means adapted to cooperate with said scale to indicate the angular position of said telescope.

Signed at Troy in the county of Rensselaer and State of New York this 3d day of March A. D. 1922.

JAMES GEIER.